(12) United States Patent
Kaehler

(10) Patent No.: US 9,948,874 B2
(45) Date of Patent: Apr. 17, 2018

(54) SEMI-GLOBAL SHUTTER IMAGER

(71) Applicant: MAGIC LEAP, INC., Dania Beach, FL (US)

(72) Inventor: Adrian Kaehler, Los Gatos, CA (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

(21) Appl. No.: 15/159,491

(22) Filed: May 19, 2016

(65) Prior Publication Data

US 2016/0344957 A1   Nov. 24, 2016

Related U.S. Application Data

(60) Provisional application No. 62/163,730, filed on May 19, 2015.

(51) Int. Cl.
| | |
|---|---|
| *H04N 3/14* | (2006.01) |
| *H04N 5/335* | (2011.01) |
| *G03B 7/00* | (2014.01) |
| *H04N 5/235* | (2006.01) |
| *H04N 5/228* | (2006.01) |
| *H04N 5/353* | (2011.01) |

(52) U.S. Cl.
CPC ......... *H04N 5/3535* (2013.01); *H04N 5/3532* (2013.01)

(58) Field of Classification Search
CPC .... H04N 19/176; H04N 19/172; H04N 5/376; H04N 19/174
See application file for complete search history.

(56) References Cited

U.S. PATENT DOCUMENTS

| | | | | |
|---|---|---|---|---|
| 7,466,255 B1* | 12/2008 | Ignjatovic | ......... | H01L 27/14609 341/143 |
| 7,847,846 B1* | 12/2010 | Ignjatovic | .............. | H04N 5/378 250/208.1 |
| 2005/0073451 A1* | 4/2005 | Bocko | ................ | H04N 5/23241 341/143 |
| 2007/0206201 A1* | 9/2007 | de Groot | ............ | G01B 9/02004 356/512 |
| 2008/0079960 A1* | 4/2008 | Yamazaki | .............. | B41J 29/393 358/1.8 |
| 2009/0122168 A1* | 5/2009 | Chou | ..................... | H04N 5/213 348/243 |
| 2012/0127353 A1* | 5/2012 | Sato | ......................... | H04N 5/32 348/300 |
| 2012/0200749 A1* | 8/2012 | Boettiger | .......... | H01L 27/14621 348/273 |

(Continued)

OTHER PUBLICATIONS

Search Report dated Sep. 16, 2016, for PCT Patent Application No. PCT/US16/33354, Internationally filed on May 19, 2016, 2 pages.

(Continued)

*Primary Examiner* — Chia-Wei A Chen
(74) *Attorney, Agent, or Firm* — Morrison & Foerster LLP

(57) ABSTRACT

This disclosure is directed to an image sensor. The image sensor includes a two-dimensional pixel array divided into a plurality of blocks, each of the plurality of blocks comprising pixels arranged in at least two different rows and two different columns, and a shutter mechanism that exposes the plurality of blocks sequentially, with all pixels in each block being exposed synchronously.

15 Claims, 5 Drawing Sheets

(56) References Cited

U.S. PATENT DOCUMENTS

| | | | |
|---|---|---|---|
| 2013/0056616 A1* | 3/2013 | Kai | H01L 27/14623 250/208.1 |
| 2013/0057942 A1* | 3/2013 | Wang | G02F 1/167 359/296 |
| 2013/0264489 A1* | 10/2013 | Yagi | G01T 1/17 250/394 |
| 2013/0287119 A1* | 10/2013 | Xiang | H04N 19/61 375/240.24 |
| 2014/0027613 A1* | 1/2014 | Smith | H04N 5/2352 250/208.1 |
| 2014/0072237 A1* | 3/2014 | Tanizawa | H04N 19/463 382/233 |
| 2014/0076180 A1* | 3/2014 | Anderson, III | B41M 3/14 101/130 |
| 2014/0076184 A1* | 3/2014 | Anderson, III | B41C 1/00 101/485 |
| 2014/0078556 A1* | 3/2014 | Anderson, III | B41F 33/0081 358/3.28 |
| 2014/0133575 A1* | 5/2014 | Lee | H04N 19/105 375/240.24 |
| 2014/0133768 A1* | 5/2014 | Lee | G06T 9/00 382/232 |
| 2014/0138548 A1* | 5/2014 | Li | G01T 1/1644 250/366 |
| 2014/0226047 A1 | 8/2014 | Lahav et al. | |
| 2014/0340433 A1* | 11/2014 | Huang | H04N 13/0402 345/690 |
| 2015/0015754 A1* | 1/2015 | Fujita | H04N 5/367 348/302 |
| 2015/0036029 A1* | 2/2015 | Theuwissen | H04N 9/045 348/273 |
| 2015/0049230 A1* | 2/2015 | Lee | H01L 27/1461 348/308 |
| 2015/0062304 A1* | 3/2015 | Stein | G06K 9/00791 348/47 |
| 2015/0124132 A1* | 5/2015 | Mabuchi | H01L 27/14609 348/296 |
| 2015/0158289 A1* | 6/2015 | Marumoto | B41J 2/2132 347/15 |
| 2015/0381915 A1* | 12/2015 | Mabuchi | H04N 5/341 348/302 |
| 2016/0105596 A1* | 4/2016 | Hatakeyama | H04N 5/2355 348/239 |
| 2016/0269659 A1* | 9/2016 | Ikeda | H04N 5/35581 |

OTHER PUBLICATIONS

Written Opinion dated Sep. 16, 2016, for PCT Patent Application No. PCT/US16/33354, Internationally filed on May 19, 2016, 6 pages.

International Preliminary Report on Patentability dated Nov. 30, 2017, for PCT Patent Application No. PCT/US2016/033354, Internationally filed May 19, 2016, 8 pages.

* cited by examiner

SEMI-GLOBAL SHUTTER IMAGER

CROSS-REFERENCE TO RELATED APPLICATIONS

This application claims priority to U.S. Provisional Patent Application No. 62/163,730, filed on May 19, 2015, entitled "SEMI-GLOBAL SHUTTER IMAGER", which is hereby incorporated by reference in its entirety.

FIELD OF THE INVENTION

The present disclosure relates to the field of digital imaging and in particular to a semi-global shutter imager that can capture multiple pixel blocks sequentially but with the pixels in each block captured synchronously.

BACKGROUND OF THE INVENTION

An image sensor (or imager) generally refers to the part of an image-capturing device (e.g., a camera) that can detect and convey the information required to form an image. In a digital camera, the image sensor can typically be a silicon semiconductor on which images are captured. Structurally, the sensor can be composed of an array of photosensitive diodes (i.e., photosites) that capture photons and converts them to electrons. The buildup of electrons in each photosite can be converted to an electronic signal (e.g., a voltage), which can in turn be converted to digital data representing a picture element or pixel. These elements or pixels can then be used for assembling the final image. The final image can be stored in the camera's memory and retrieved to be viewed on a display and/or further manipulated.

Ideally, a well-designed image sensor allows the camera to have a relatively high-speed frame rate that enables the camera to capture a larger number of images within a short period of time and, at the same time, uphold image quality by minimizing the amount of undesirable effects such as motion artifacts in the result images.

BRIEF SUMMARY OF THE INVENTION

This disclosure generally relates to a semi-global shutter imager and mechanism that can capture and process multiple pixel blocks sequentially with the pixels in each block captured synchronously. The sensor elements (or pixels) of the image sensor can be divided into multiple pixel blocks. All pixels in the same block can be exposed to light at the same time. Thereafter, while data from the exposed block of pixels is still being read out, another block of pixels can be exposed. This process can repeat until all pixels are exposed and read out. This can significantly reduce the delay between the exposure of the pixels and when the information captured in the pixels are analyzed, thereby increasing the frame rate (or speed) or the camera. In addition, by setting an optimal number of pixel blocks for a given semi-global shutter image sensor and exposing all pixels in each pixel block at the same time, the semi-global imager can also reduce certain forms of undesirable distortions (e.g., motion artifacts) to the result images that can be caused by the sequential exposures of the pixel blocks.

Generally, an image sensor may include a two-dimensional pixel array divided into a plurality of blocks, each of the plurality of blocks comprising pixels arranged in at least two different rows and two different columns, and a shutter that exposes the plurality of blocks sequentially, with all pixels in each block being exposed synchronously. The shutter may, for instance, be electronically controlled. The pixel array may have various configurations. For example, the pixel array may include a rectangular array with M rows of pixels where M is no less than 100, and where a height of each block is at least one twentieth of a combined height of M rows but no more than one fifth of the combined height of M rows. As another example, the pixel array may include a rectangular array with N columns where N is no less than 100, and wherein a width of each block is at least one twentieth of a combined width of N columns of pixels but no more than one fifth of the combined width of N columns. Some of the blocks may include different number of pixels in other suitable arrangements and geometric shapes, while some of the blocks may include the same number of pixels.

In some variations, the image sensor may include or be configured for use with a timing control module that transmits a timing signal to each of the blocks, where the timing signal initiates a sequence of exposures of the blocks. Furthermore, the image sensor may include or be configured for use with separate readout electronics for each of the plurality of blocks, where the readout electronics may be capable of receiving and processing electronic signals from the pixels in a corresponding block. Such separate readout electronics may, for instance, include an amplifier that amplifies the electronic signals and an analog-to-digital converter that converts the electronic signal to digital data. Furthermore, in one variations of the image sensor, the readout electronics may read out electronic signals from a first block of pixels immediately after an exposure of the first block is completed, and an exposure of a second block begins before the readout of the electronic signals from the first block is completed. In another variation, there may be delay between the exposure of a second block and the exposure of a first block, where the delay is great enough to allow for a readout of the first block before the second block completes its exposure.

Generally, a method of capturing an image with an image sensor may include dividing a two-dimensional pixel array image area of the image sensor into a plurality of blocks, each of the plurality of blocks comprising pixels arranged in at least two different rows and two different columns, and sequentially exposing the plurality of blocks, with all pixels in each block being exposed synchronously. The method may be used with image sensors of various configurations, such as an image sensor with a two-dimensional pixel array including M rows of pixels, where M is no less than 100, and where a height of each block is at least one twentieth of a combined height of M rows of pixels, but no more than one fifth of the combined height of M rows. As another example, the method may be used with an image sensor with a two-dimensional pixel array including N columns, where N is no less than 100 and a width of each block is at least one twentieth of a combined width of N columns of pixels but no more than one fifth of the combined width of N columns.

The method may include transmitting a timing signal to each of the blocks, where the timing signal initiates a sequence of exposures of the blocks. The method may also include reading out electronic signals arranged in at least a first block and a second block of the plurality of blocks sequentially. In one variation, the electronic signals from the first block of pixels may be read out immediately after an exposure of the first block is completed, and an exposure of the second block may begin before the readout of the electronic signals from the first block is completed. Furthermore, there may be a delay between the exposure of the second block and the exposure of the first block where the delay is great enough to allow for a readout of the first block before the exposure of the second block is completed.

Generally, a digital camera may include an image sensor including a two-dimensional pixel array divided into a plurality of blocks, each of the plurality of blocks including pixels arranged in at least two different rows and at least two different columns; a lens that directs light to the image sensor; a shutter that exposes the plurality of blocks sequentially, with all pixels in each block being exposed synchronously, and a timing control module that controls the timing of a sequence of exposures of the blocks; readout electronics for each of the plurality of blocks where the readout electronics are capable of receiving and/or processing electronic signals from the pixels in a corresponding block; and a camera application-specific integrated circuit (ASIC) that assembles an image from an output of the readout electronics.

DETAILED DESCRIPTION OF THE INVENTION

In the following description of preferred embodiments, reference is made to the accompanying drawings which form a part hereof, and in which it is shown by way of illustration specific embodiments which can be practiced. It is to be understood that other embodiments can be used and structural changes can be made without departing from the scope of the embodiments of this disclosure.

As used herein, the term "digital camera" can refer to any digital image/video capturing device with an image sensor. The terms "image sensor" and "imager" can be used interchangeably to describe one or more components in a digital camera that can detect and convey the information that forms one or more images. The image sensor can include an image area composed of an array of sensor elements such as photosites. The terms "photosite," "photosensitive diode," and "photodiode" are used interchangeably in this document. Each sensor element can also be referred to as a "pixel" of the image sensor. The terms "block" and "pixel block" can refer to a region in the image area that includes multiple pixels of the image sensor. It should be noted that each block of pixels can be of any size and geometric shape, according to the embodiments of this disclosure. In the preferred embodiments, the blocks can be contiguous and/or have the largest practical ratio of area to boundary. The terms "image," "result image," and "final image" can be used interchangeably to refer to a digital image captured by the image sensor of a digital camera. An image can be a standalone image or a frame of a video.

This disclosure generally relates to a semi-global shutter imager and mechanism that can capture and process multiple pixel blocks sequentially with the pixels in each block captured synchronously. The sensor elements (or pixels) of the image sensor can be divided up (or grouped) into multiple pixel blocks. All pixels in the same block can be exposed to light at the same time. The exposure can be achieved by any suitable electrical control over the integrating element. For example, it can involve a combination of tying the charge surface to ground and closing a CMOS transistor from the element to the readout latch. Thereafter, while data from the exposed block of pixels is still being read out, another block of pixels can be exposed. This process can repeat until all pixels are exposed and read out. This can significantly reduce the delay between the exposure of the pixels and when the information captured in the pixels are analyzed. In addition, by setting an optimal number of pixel blocks for a given image sensor and exposing all pixels in each pixel block at the same time, the semi-global imager can also reduce certain forms of undesirable distortions (e.g., motion artifacts) to the result images that can be caused by the sequential exposures of the pixel blocks.

Figure 1:
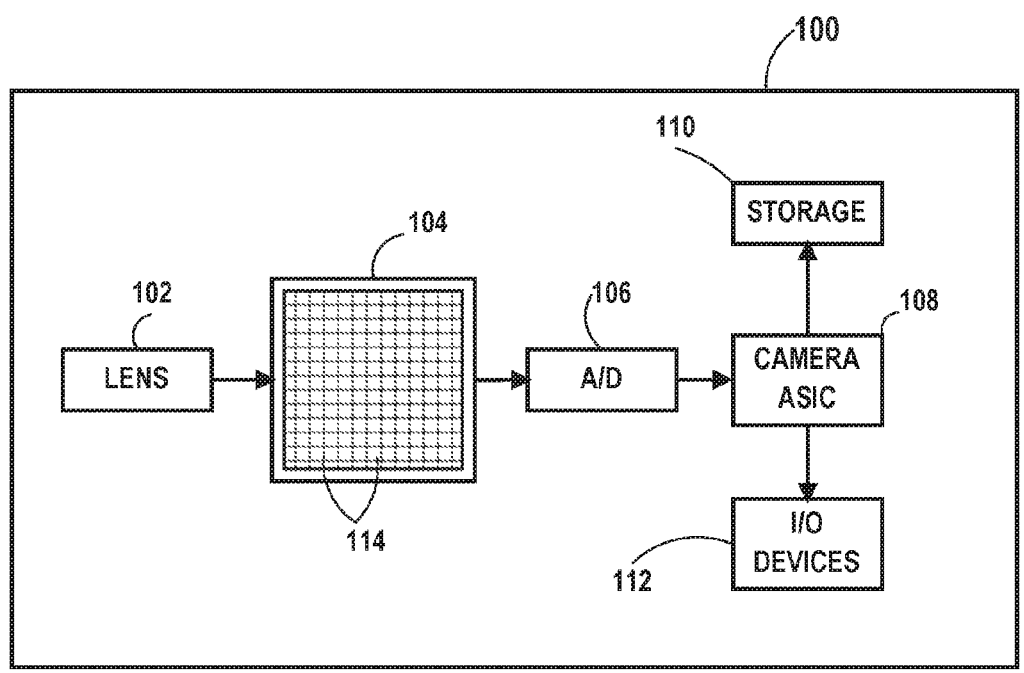
FIG. 1 is a block diagram illustrating the exemplary components of a digital camera 100, according to an embodiment of the disclosure.

FIG. 1 is a block diagram illustrating the exemplary components of a digital camera 100, according to an embodiment of the disclosure. The digital camera 100 can include a lens 102, an image sensor 104, an Analog-to-Digital (A/D) Converter 106, a camera Application-Specific Integrated Circuit (ASIC) 108, a storage device 110, and one or more input/output (I/O) devices 112. When a shutter button (not shown in FIG. 1) on the camera 100 is pressed, light can pass through the lens 102 and reach the image sensor 104. The image sensor 104 can include a two-dimensional array of sensor elements (e.g., photosites) 114 capable of capturing the light. In certain types of image sensors (e.g., CCD sensors), an electric change can build up in each photosite based on the amount of light captured. The accumulated electric charge can then be transformed into a digital signal (e.g., a digital number) by the A/D Converter 106. In other types of image sensors (e.g., CMOS sensors), each photosite can read out how much light is hitting the pixel at the moment of exposure and convert that into an electronic signal without storing any charge. The electronic signal can then be digitized by the analog/digital (A/D) Converter 106 and then processed by the camera application-specific integrated circuit (ASIC) 108 to form an image element.

A final image can be assembled when the camera ASIC 108 finishes processing the digital signals embodying the data captured by each and every photosite 114 of the image sensor 104. The process of forming the image can include the optional step of removing background noise from the result image. The image can be stored in the storage 110 and/or output via the I/O device 112. The storage device 110 can be any suitable storage device including but not limited to a memory card, hard drive, internal memory, and external storage space such as a cloud storage service. The I/O device 112 can output the image to a display (not shown in FIG. 1) of the digital camera 100 or transmit it over a network to another device.

It should be understood that FIG. 1 only illustrates some of the exemplary components of the digital camera 100, which may include other components not shown in FIG. 1.

For example, the digital camera 100 can also include a flash, zoom and focus modules, anti-aliasing filter, battery, and other components commonly found in a digital camera. The camera ASIC 108 can be connected to a central processing unit (CPU) designed to perform operations of the digital camera that are not handled by the camera ASIC 108.

Embodiments of the present disclosure are generally directed to the image sensor 104 illustrated in FIG. 1 and the shutter mechanisms associated with the image sensor 104. The shutter mechanism in a digital camera 100 can control the exposure of the sensor array of the image sensor 104 when an image is taken by the camera 100. The shutter mechanism can be electronic, mechanical, or a combination of both. A timing mechanism can be built in the camera to control light exposure time for the pixels of the image sensor and, depending on the shutter mechanism, the order in which the pixels are exposed. Presently, most digital cameras employ one of two types of shutter mechanisms, either a global shutter or a rolling shutter. As described in the following paragraphs, these two types of shutter mechanisms have their respective advantages and drawbacks.

Figure 2A:
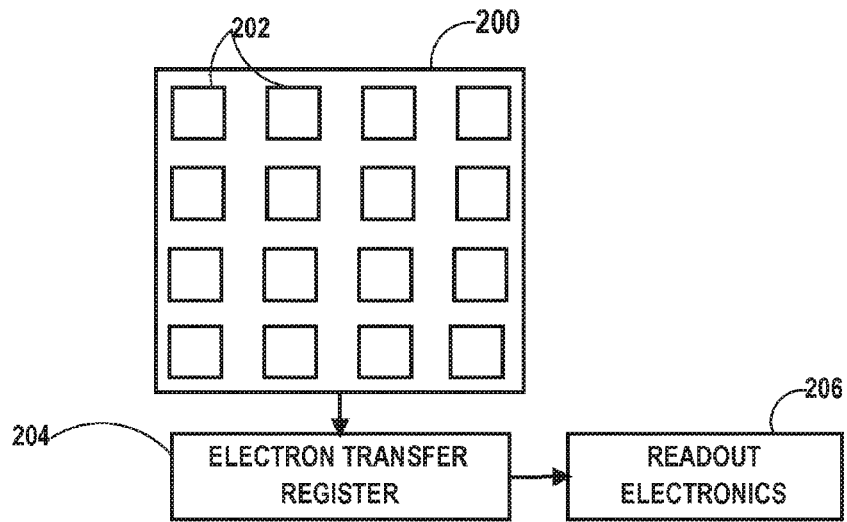
FIG. 2a is a block diagram illustrating the exemplary components of a CCD image sensor 200 with a global shutter.

Global shutters can typically be found in cameras with Charge Coupled Device (CCD) image sensors. FIG. 2a is a simplified block diagram illustrating the exemplary components of a CCD image sensor 200 with a global shutter. For illustration purposes, the CCD image sensor 200 is shown to include a 4×4 two-dimensional pixel array 202, although it should be understood that the image sensor can include any number of columns and rows of pixels aligned in any configuration, or pixels arranged in any suitable configuration. In fact, it is not uncommon for a CCD image sense to have hundreds or even thousands of rows and/or columns of pixels. Each pixel can correspond to a photosite of the image sensor 200 and be capable of capturing photons. The pixels 202 can be connected to an electron transfer register 204, which can in turn be connected to readout electronics 206 that can include, but are not limited to, an amplifier and A/D converter. It should also be understood that the CCD image sensor 200 can include other components that are omitted from FIG. 2a for clarity purposes.

The global shutter of the imager 200 of FIG. 2a can operate such that when the shutter is "open," light can reach the entire sensor array of the imager 200 for a predetermined period of time (shutter time or exposure time). During that time, all pixels 202 of the image sensor 200 can capture light (e.g., accumulate charge) in parallel. When the shutter is blocked, light can no longer reach the sensor and the pixels can become inactive. The global shutter in a CCD digital camera can be electronically controlled in order to control the exposure.

After the capture is completed, the signals collected in the pixels can be transferred, for example, one pixel at a time, to the electron transfer register 204, from where they can be read out and processed by the readout electronics 206. The process can include amplifying the signals and/or converting them into a digital format (e.g., digital numbers), which can form the result image.

In digital imaging, the result image can include a number of keypoints, which can be defined by a small section of the image (e.g., a 5×5 or 10×10 pixel block) that includes one or more highly localizable and recognizable features of the image. The keypoints can be produced by processing one or more of the raw pixels. Each keypoint can include a descriptor that describes the keypoint so that it can be recognized in the different frames of a series of images taken consecutively. The movement of the camera and the direction in which it is pointing can be determined by matching the various keypoints from the different frames. This approach is often used when implementing SLAM (simultaneous localization and mapping) algorithms.

This sequential charge-transfer approach to the electron transfer register 204 and the readout electronics 206 employed by a global shutter imager can be time-consuming, especially if the image sensor includes a large number of pixels, because the data from each pixel of the imager has to be read out sequentially. That can mean that the delay between the exposure of the last pixels (along with all other pixels in a global shutter imager) and when these pixels can be analyzed (i.e., after all other pixels have been analyzed) can be significant. In other words, when information read out from these last pixels is finally processed, it may not necessarily reflect the current position of the camera with respect to a scene accurately if there was relative movement between the camera and the scene. For example, if it takes a typical global shutter CCD imager around 15 milliseconds between exposures to read out all the pixel values and calculate the keypoints of the image, there can be a 15 milliseconds delay before information from the last pixels are analyzed, which may affect, for example, the determination of the camera's movement (or movement in the scene being captured). This is one of the main drawbacks of a global shutter imager.

Because a global shutter allows a CCD image sensor to capture an entire image at the exact same moment by exposing all pixels simultaneously, one of the advantages of the global shutter is that the result image can usually have relatively high quality and be free of significant undesirable effects such as motion artifacts. All the keypoints (e.g., small pixel blocks) can be kept intact and easily identifiable in a series of consecutive images.

A second type of shutter mechanism, the rolling shutter, can typically be found in digital cameras with complementary metal-oxide-semiconductor (CMOS) image sensors. In contrast to the global shutter, a rolling shutter can allow individual pixels or individual columns/rows of pixels to be exposed sequentially so that the information at a first pixel (or a first column/row of pixels) can be read out while the next pixel (or next column/row of pixels) is being exposed to light. The CMOS image sensors can achieve this rolling effect by turning on/off the pixels (or columns/rows of pixels) systematically in a predetermined order.

Figure 2B:
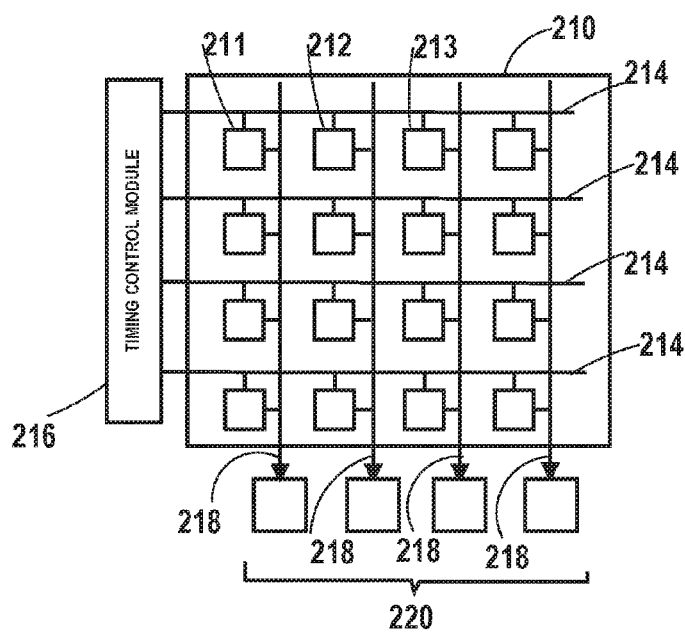
FIG. 2b is a block diagram illustrating the exemplary components of a CMOS image sensor 210 with a rolling shutter.

FIG. 2b is a block diagram illustrating the exemplary components of a CMOS image sensor 210 with a rolling shutter. For illustration purposes, the CMOS image sensor 210 is shown to include a 4×4 two-dimensional pixel array, although it should be understood that the image sensor can have any number of columns and rows of pixels aligned in any configuration, or arranged in any suitable configuration. Each pixel 211, 212, 213 of the two-dimensional pixel array of FIG. 2b can be a photodiode capable of converting light into electronic signals. A grid of conductive interconnects 214, 218 overlaying the image sensor 210 can connect the pixels by rows and columns for applying timing and readout signals. In particular, the interconnects can include row signal lines (collectively 214) for transmitting timing signals from a clock and timing control module 216 to each pixel (or each row/column of pixels). The timing signal can control when each individual pixel or row of pixels is exposed to light and also when the electronic signals from each pixel are read out. The interconnects can also include vertical output lines (collectively as 218) for reading out the signals from the pixels and transmitting them to readout electronics (collectively as 220) for further processing. As illustrated in FIG. 2b, each output line can be connected to separate readout electronics 220. The readout electronics 220 for each output line can include, for example, an amplifier and A/D converter, which can amplify and convert the signals into a digital format (e.g., digital numbers). The digital information can be used to assemble a final image. In some CMOS sensors, at least some of the readout electronics 220 can be embedded in the individual pixels of the image sensor. It should also be understood that the CMOS image sensor 210 of FIG. 2b can include other components that are omitted from the figure for purpose of clarity.

This architecture of the CMOS sensor 210 allows each of its pixels 212 (or each row/column of pixels) to be turned on/off independently and the signals from the pixels (or rows/columns of pixels) to be read out sequentially. In operation, the clock and timing control module 216 can send out timing signals to the individual pixels (or individual rows/columns of pixels) to control the timing of their exposure. As soon as one pixel is exposed, its value can be read out. There is virtually no delay between the exposure and the readout. In addition, the shuttering effect with regard to each pixel (or row/column of pixels) can be programmed to occur on a rolling basis across all pixels. For example, when the pixel value of the first pixel 211 is being read out, the second pixel 212 can be finishing its capturing process. Similarly, when the pixel value of the second pixel 212 is being read out, the third pixel 213 can be capturing light. Similarly, if a row of pixels is exposed and readout together, the next row can begin capturing light before the previous row finishes its readout. Essentially, every pixel (or row of pixels) is read out a bit later than every other pixel (or the next row of pixels). Every pixel (or row) readout can be skewed relative to its neighbor by a fraction of, for example, a microsecond. Thus, there is almost always at least one pixel being exposed and there is almost no delay between exposure and readout for any individual pixel. This allows cameras with rolling shutter imagers to reduce, for at least some of the pixels, the delay between the exposure of the pixel and analysis of the information read out from the pixel. The reduction can be especially significant for pixels that are exposed and read out last compared to if they were processed by a global shutter imager.

However, because the rolling shutter staggers the exposure time for the individual pixels (or individual rows/columns of pixels), the information captured by different pixels will be captured at different moments in time. If there are relative movements between objects in the scene being captured and the camera, the result image can have noticeable motion artifacts such as wobble, skew, smear, etc. due to the staggered exposure of the different pixels. This is one of the drawbacks of a rolling shutter imager. In addition, one or more keypoints may be distorted beyond recognition as a result of not all the pixels in a keypoint is exposed at the same time. The distorted keypoints may no longer be able to identify the corresponding features in a series of consecutive frames, thus affecting the camera's ability to track its own movement or the movement of an object being captured.

In short, both of the above-discussed shutter mechanisms have significant drawbacks: the global shutter imagers can cause delays between pixel exposure and analysis and the rolling shutter imagers can cause undesirable effects (e.g., distortions) to the resultant images. To minimize these shortcomings, the following embodiments disclose image sensors with a third type of shutter mechanism, referred to herein as a "semi-global shutter." A semi-global shutter can reduce the delays between pixel exposure and analysis while reducing certain forms of undesirable distortions.

Specifically, image sensors with semi-global shutters can divide (or group) its two-dimensional pixel array into multiple pixel blocks, each block including multiple pixels in a region of the image area. A semi-global shutter can allow all pixels in the same block to be exposed simultaneously and read out as a group. As such, semi-global shutters may be able to capture images free of motion artifacts, at least within each pixel block. The blocks can be exposed and readout on a rolling basis. That is, while data from one block of pixels is read out and processed, the next block of pixels can be exposed. This can allow the blocks to be exposed in an overlapping or sequential manner, which can significantly reduce or eliminate the delay between consecutive exposures that a global shutter imager typically suffer. This can provide speed advantages.

In addition, semi-global shutters can reduce the amount of motion artifacts that can often be associated with images taken with rolling shutter imagers. In various embodiments, this can be achieved by dividing the pixels into the optimal number of pixel blocks according the requirements and/or intended usage of the camera. As discussed above, a rolling shutter is typically programmed to expose and read out one pixel or one row/column of pixels at a time. For an image sensor with a large number of pixels (or rows of pixels), the difference in the exposure time of each pixel or row of pixels caused by the rolling exposure can be substantial, resulting in easily-noticeable motion artifacts in the final images. A semi-global shutter can roll through blocks of multiple rows/columns of pixels at a time. As an example, if each block has 10 rows, the amount of potential motion artifacts could effectively be reduced by a factor of about ten compared to a rolling shutter that rolls through the pixels one row at a time. Ideally, the pixel blocks can be defined to achieve a balance between frame rate and image quality for any particular camera with a semi-global shutter images.

Figure 3:
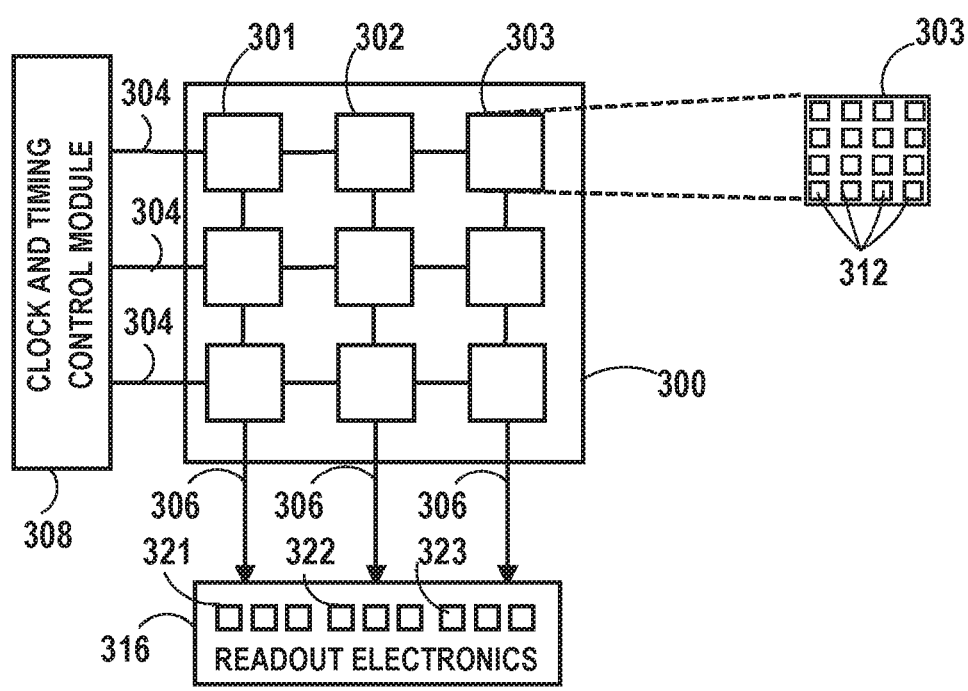
FIG. 3 a block diagram illustrating the exemplary components of an image sensor 300 with a semi-global shutter, according to an embodiment of the disclosure.

FIG. 3 is a block diagram illustrating the exemplary components of an image sensor 300 with a semi-global shutter. The image area of the sensor 300 can be divided into 9 pixel blocks in a 3×3 layout. For example, the top row can include pixel blocks 301, 302, 303. Each block can include multiple pixels. An enlarged view of block 303 shows that block 303 includes a 4×4 array of pixels. In this embodiment, each block can include the same number of pixels arranged in the same formation. However, the disclosure is not so limited and in other embodiments the blocks can include different numbers and/or arrangements of pixels. Every pixel 312 in the blocks can be a sensor element (i.e., photosite) capable of converting light into electronic signals.

A number of block signal lines (collectively 304) can transmit timing signals from a clock and timing control module 308 to each of the nine pixel blocks. The timing signal can control when each pixel block is exposed to light and also when the electronic signals from the pixel blocks are read out. Although only three block signal lines are shown in FIG. 3, it should be understood that every pixel block may be separately connected to the clock and timing control module 308 and can be triggered independently. A number of output lines 306 can transmit the electronic signals from the pixels in each pixel block to readout electronics 316 for processing. Only three vertical lines are marked as output lines 306 in FIG. 3 for clarity purposes. However, it should be understood that every pixel block may be separately connected to the readout electronics 316 and the signals from each pixel block can be read out in parallel. The readout electronics 316 in this embodiment can be designed to process signals received from each of the nine pixel blocks in parallel. As illustrated, the readout electronics 316 can include nine separate submodules each responsible for processing signals from one of the nine pixel blocks. For example, submodules 321, 322, 323 can readout signals from pixel blocks 301, 302, 303 respectively. Each submodule can include, for example, an amplifier and A/D converter for amplifying and converting the signals into a digital format (e.g., digital numbers), respectively. The digital information can be processed to assemble a final image. It should also be understood that the semi-global shutter imager 300 of FIG. 3 can include other components that are omitted from the figure for clarity purposes. The exemplary arrangement schematically shown in FIG. 3 may be expanded for any suitable number of pixel blocks and their respective submodules.

In operation, the semi-global shutter can be programmed to expose the pixel blocks on a rolling basis. For example, within the same pixel block, all the pixels can be exposed simultaneously and the signals from each pixel in the pixel block can be read out one pixel at a time and transferred over one of the output lines to a corresponding submodule in the readout electronics 316. Each pixel block may not be exposed again until the readout is completed. However, while the first pixel block 301 is being read out, a second pixel block 302 can be exposed. Similarly, while the signals from the pixels in the second pixel block 302 are being read out, a third pixel block 303 can be exposed. This overlapping in exposure and readout of the different blocks can minimize or eliminate the delays that typically occur between exposures in a global shutter imager.

Figure 4:
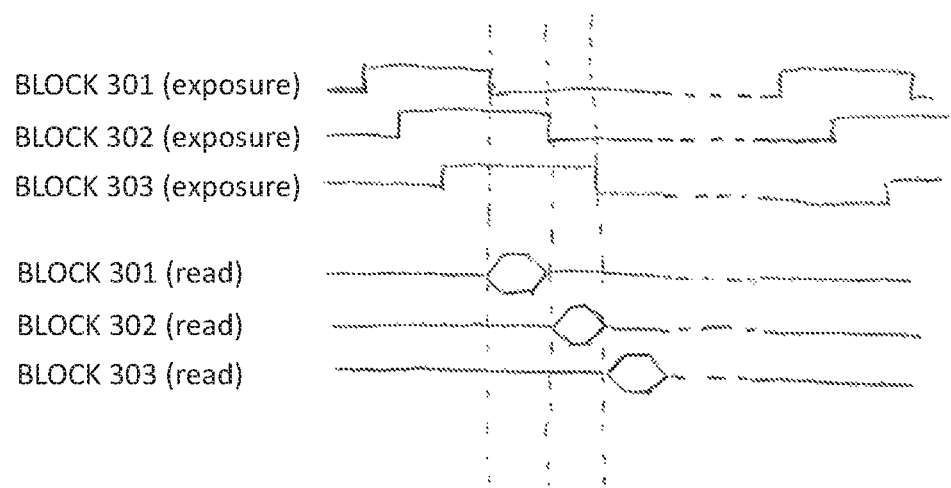
FIG. 4 illustrates an exemplary timeline of the exposures and readouts of three of the blocks in the semi-global shutter imager of FIG. 3, according to an embodiment of the disclosure.

FIG. 4 illustrates an exemplary timeline of the exposures (top) and readouts (bottom) of three of the pixel blocks 301, 302, 303 in the semi-global shutter imager 300 of FIG. 3. As illustrated, the exposure and readout of each block 301, 302, 303 can be sequential, but the triggering of successive blocks can be overlapping. Each pixel block can be exposed slightly after its predecessor, with the exposure delay allowing for readout of one or more previously-exposed pixel blocks before the current pixel block completes its exposure. As an example, exposure of pixel block 302 in the sequence may be triggered before the readout time for the previous pixel block (e.g., pixel block 301) can be completed. Similarly, the exposure of block pixel 303 may be triggered before the readout time for block 302 can be completed. This can increase the use of the output digital transfer bandwidth from the imager. When all the pixel blocks (including the six not shown in the timeline of FIG. 4) complete a cycle of exposure and readout. The first block (i.e., block 301) can be exposed again without any delay.

Alternatively, the pixel blocks can be triggered sequentially, in which each block can begin its exposure only after the prior pixel block has completed its exposure. For example, this can be suitable for computer vision applications, as blurring effects from motion may not include identical sub-windows of integration time. Regardless of whether overlapping or sequential triggering is implemented, the pixel blocks can be read out immediately after their exposure time is complete.

Because there is less delay between the exposures of a pixel block and the analysis of the information captured by the pixels in the pixel block, the information generated by a semi-global shutter imager can be more accurate in reflecting the location and/or movement of the camera and/or scene being captured than a global-shutter imager of the same pixel resolution, which would require the entire image to be readout before information from the pixels can be analyzed. One potential delay in a semi-global shutter imager may occur when the signals from individual pixels in the same block are read out. However, this delay can be significantly shorter than the delay in a comparable global shutter imager. For example, if the delay on a global shutter imager is 15 milliseconds for the pixels read out last, the delay on a semi-global shutter imager for the same pixels (or any of the last pixels in each block) is only 1.5 milliseconds if the semi-global shutter imager is divided into ten pixel blocks of the same size. Accordingly, the images captured with semi-global shutter imagers may be superior for machine readable images such as those used for tracking keypoints in an image.

Although both semi-global shutters and rolling shutters can capture an image by scanning across the scene rather than taking a snapshot of the entire scene, semi-global shutter can achieve better image quality than a rolling shutter when there is relative movement between the camera and the scene for some applications. This is because the number of pixel blocks in a semi-global shutter imager can be much lower than the number of pixels or rows in a rolling shutter imager. By dividing the pixels into fewer pixel blocks, the motion artifacts in the final image can be confined. The only regions in an image that may be affected by the sequential exposure of the pixel blocks are the boundaries between the blocks. In contrast, motion artifacts can appear anywhere on an image taken by a camera with rolling shutter imager because the rolling shutter rolls through the pixels one row at a time. However, these images may be suitable for machine readable images such as those used for tracking keypoints in an image.

As an example, a 9×9 pixel array of a semi-global shutter imager can be divided into three pixel blocks each including three rows of pixels, resulting in two boundaries between the three pixel blocks. If the same 9×9 pixel array is read out row by row using a rolling shutter, there are eight boundaries between the nine rows. That corresponds to significantly more areas that may be affected by motion artifacts in the images taken with the rolling shutter imager than those taken with the semi-global shutter imager. In addition, the fewer boundaries in the semi-global shutter can also mean that fewer keypoints would get distorted beyond recognition when the shutter rolls through the pixel blocks.

A semi-global shutter can divide the image array into any suitable number of pixel blocks and each pixel block can have any suitable number of pixels. In various embodiments, any arrangement of pixel blocks, including ones of non-equal size, non-compact, or non-contiguous configurations, is possible. Preferably, the number of pixel blocks can be set to both achieve a shorter delay between pixel exposure and analysis than a comparable global shutter imager and be less prone to certain forms of distortions in the result images than a comparable rolling shutter imager. For example, one might wish to divide a 1000×1000 pixel image area of a semi-global shutter imager into 10 blocks (e.g., each a 100×1000 block). It can reduce the delay between pixel exposure and analysis, for at least some of the pixels, by 10 times compared to a global shutter imager with the same 1000×1000 pixel image area. Additionally, the rolling shutter effect (e.g., motion artifacts) can only be an issue at the boundaries between the pixel blocks rather than throughout the image area as would be the case in a rolling shutter imager.

For cameras that require a short delay between pixel exposure and analysis, it would be ideal to have a semi-global shutter imager having an image area divided into a large number of pixel blocks, each including fewer pixels. In contrast, for cameras that favor image quality (e.g., minimizing certain forms of distortion) over shorter periods of delay, a semi-global shutter imager with a small number of pixel blocks can be more desirable.

Figure 5A:
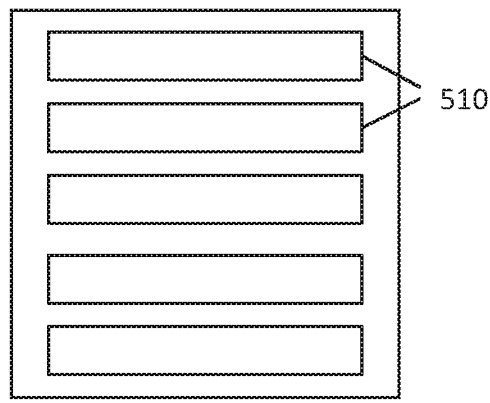
FIGS. 5a-5c illustrate various pixel block configurations suitable for various semi-global shutter imagers, according to an embodiment of the disclosure.
Figure 5B:
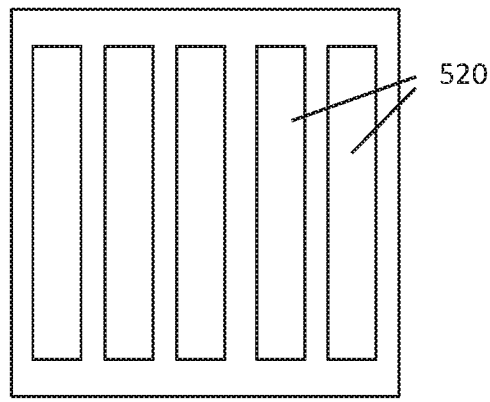
Figure 5C:
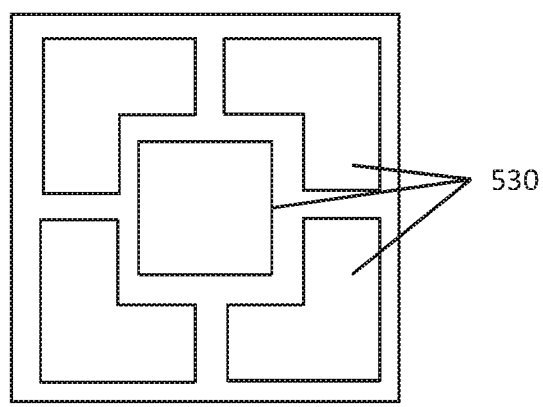

A semi-global imager may include pixel blocks of any suitable geometric shape and arrangement. While FIG. 3 illustrates one embodiment in which the exemplary blocks are squares of the same size, FIGS. 5a-5c illustrate other exemplary divisions of pixel blocks suitable for various semi-global shutter imagers. In particular, FIG. 5a illustrates an image area divided horizontally into five (or N number of) rectangular pixel blocks 510, each including the same number of rows of pixels. FIG. 5b illustrates an image area divided vertically into five (or M number of) pixel blocks 520, each having the same number of columns of pixels. FIG. 5c illustrates a configuration of five pixel blocks 530 that are of different shapes and/or sizes. As discussed above, the number and/or geometric shape of the pixel blocks can be optimized so that the areas between the pixel blocks are kept to a minimum. This can provide significant advantage in image quality for a semi-global shutter imager than a rolling shutter imager.

In one embodiment, instead of dividing the image area of an relatively large resolution image sensor into multiple pixel blocks (as shown in FIG. 3 for example), a semi-global shutter can be implemented by assembling multiple relatively low-resolution imagers in the same configuration (e.g., each block in FIG. 3 substituted by a standalone low resolution imager). These relatively low-resolution imagers can have their triggers staggered in time and controlled by a central controller. Each imager can individually operate at a pixel clock rate such that the transmission per pixel block is inversely a function of the size of the imager. In one embodiment, when cutting the wafer for the low-resolution imagers, the dies for the individual imagers may not be separated by the cutting.

It should be understood that, the application of the present disclosure is not limited to the above-mentioned embodiments. It will be possible for a person skilled in the art to make modifications or replacements according to the above description, all of those modifications or replacements shall all fall within the scope of the appended claims of the present disclosure.

What is claimed is:

1. An image sensor comprising:
    a two-dimensional pixel array divided into a plurality of blocks, each of the plurality of blocks comprising pixels arranged in at least two different rows and two different columns, and
    a shutter that exposes the plurality of blocks, with all pixels in each block being exposed synchronously;
    readout circuitry comprising a plurality of readout circuits, each readout circuit corresponding to one of the plurality of blocks, each of the readout circuits capable of receiving and processing signals from the pixels in each corresponding block; and
    wherein the two-dimensional pixel array includes M rows of pixels, M no less than 100, and wherein a height of each block is at least one twentieth of a combined height of M rows but no more than one fifth of the combined height of M rows;
    wherein the two-dimensional pixel array includes N columns N no less than 100, and a width of each block is at least one twentieth of a combined width of N columns of pixels but no more than one fifth of the combined width of N columns.

2. The image sensor of claim 1, wherein at least two of the blocks include different number of pixels.

3. The image sensor of claim 1, wherein at least two of the blocks have different geometric shapes.

4. The image sensor of claim 1, wherein each of the plurality of blocks includes a same number of pixels.

5. The image sensor of claim 1, comprising:
    a timing control module that transmits a timing signal to each of the blocks, the timing signal initiating a sequence of exposures of the blocks.

6. The image sensor of claim 1, wherein the readout circuitry comprises an amplifier that amplifies the signals and an analog-to-digital converter that converts the signals to digital data.

7. The image sensor of claim 1, wherein the plurality of blocks include a first block and a second block,
    wherein the readout circuitry reads out the signals from the first block of pixels immediately after an exposure of the first block is completed, and
    wherein an exposure of the second block begins before the readout of the signals from the first block is completed.

8. The image sensor of claim 1, wherein the plurality of blocks include a first block and a second block, and
    wherein there is a delay between the exposure of the second block and the exposure of the first block, the delay being great enough to allow for a readout of the first block before the second block completes its exposure.

9. The image sensor of claim 1, wherein the shutter is electronically-controlled.

10. A method of capturing an image with an image sensor, comprising:
    dividing a two-dimensional pixel array image area of the image sensor into a plurality of blocks, each of the plurality of blocks comprising pixels arranged in at least two different rows and two different columns,
    sequentially exposing the plurality of blocks, with all pixels in each block being exposed synchronously;
    reading out each of the plurality of blocks with a plurality of separate readout circuits, each readout circuit corresponding to one of the plurality of blocks;
    wherein the two-dimensional pixel array includes M rows of pixels, M no less than 100, and wherein a height of each block is at least one twentieth of a combined height of M rows but no more than one fifth of the combined height of M rows; and
    wherein the two-dimensional pixel array includes N columns N no less than 100, and a width of each block is at least one twentieth of a combined width of N columns of pixels but no more than one fifth of the combined width of N columns.

11. The method of claim 10, comprising:
    transmitting a timing signal to each of the blocks, the timing signal initiating a sequence of exposures of the blocks.

12. The method of claim 10, comprising:
    reading out signals from at least a first block and a second block of the plurality of blocks sequentially.

13. The method of claim 12, wherein the signals from the first block of pixels is read out immediately after an exposure of the first block is completed, and
    wherein an exposure of the second block begins before the readout of the signals from the first block is completed.

14. The method of claim 12, wherein there is a delay between the exposure of the second block and the exposure of the first block, the delay being only great enough to allow for a readout of the first block before the second block completes its exposure.

15. A digital camera comprising:
an image sensor comprising a two-dimensional pixel array divided into a plurality of blocks, each of the plurality of blocks comprising pixels arranged in at least two different rows and two different columns; a lens that directs light to the image sensor;
a shutter that exposes the plurality of blocks sequentially, with all pixels in each block being exposed synchronously;
a timing control module that controls the timing of a sequence of exposures of the blocks;
readout circuitry comprising a plurality of readout circuits, each readout circuit corresponding to one of the plurality of blocks, each of the readout circuits capable of receiving and processing signals from the pixels in each corresponding block;
wherein the two-dimensional pixel array includes M rows of pixels, M no less than 100, and wherein a height of each block is at least one twentieth of a combined height of M rows but no more than one fifth of the combined height of M rows;
wherein the two-dimensional pixel array includes N columns N no less than 100, and a width of each block is at least one twentieth of a combined width of N columns of pixels but no more than one fifth of the combined width of N columns; and
a camera ASIC that assembles an image from an output of the readout circuitry.

* * * * *